United States Patent
Clarke et al.

(10) Patent No.: US 12,106,105 B2
(45) Date of Patent: Oct. 1, 2024

(54) AUTOMATIC GENERATION OF CONVERGENT DATA MAPPINGS FOR BRANCHES IN AN INTEGRATION WORKFLOW

(71) Applicant: International Business Machines Corporation, Armonk, NY (US)

(72) Inventors: Matthew James Clarke, Newbury (GB); Ashley Donald Harrison, Southampton (GB); Nishan Lakmal Satharasinghe, Andover (GB); Sarah Beth Carnaby Hewitt, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 17/448,591

(22) Filed: Sep. 23, 2021

(65) Prior Publication Data
US 2023/0090244 A1    Mar. 23, 2023

(51) Int. Cl.
| | | |
|---|---|---|
| *G06F 16/21* | (2019.01) | |
| *G06F 9/30* | (2018.01) | |
| *G06F 9/48* | (2006.01) | |
| *G06F 7/02* | (2006.01) | |
| *G06F 7/32* | (2006.01) | |

(52) U.S. Cl.
CPC .......... *G06F 9/3005* (2013.01); *G06F 9/4881* (2013.01); *G06F 16/211* (2019.01); *G06F 7/02* (2013.01); *G06F 7/32* (2013.01); *G06F 2209/482* (2013.01)

(58) Field of Classification Search
CPC ..... G06F 16/211; G06F 9/4881; G06F 9/3005
See application file for complete search history.

(56) References Cited

U.S. PATENT DOCUMENTS

| | | |
|---|---|---|
| 9,201,558 B1 | 12/2015 | Dingman |
| 9,811,543 B2 | 11/2017 | Morrison |
| 2003/0004958 A1* | 1/2003 | Russell ............... G06F 16/2468 |
| 2012/0078913 A1* | 3/2012 | Muni ..................... G06F 16/211 |
| | | 707/769 |
| 2019/0188035 A1 | 6/2019 | Nicholson |
| 2019/0384836 A1 | 12/2019 | Roth |
| 2020/0241854 A1 | 7/2020 | Stojanovic |
| 2021/0255854 A1* | 8/2021 | Coscarelli ............. G06F 11/362 |
| 2023/0026819 A1* | 1/2023 | Love ................... G06F 12/0804 |

OTHER PUBLICATIONS

Agarwal, Matu, "IBM App Connect 'Mapping Assist'—Putting AI to Work for Your Business", IBM Integration Community, Jun. 24, 2020, Copyright © 2021 IBM Community, 6 pages.
Mell et al., "The NIST Definition of Cloud Computing", National Institute of Standards and Technology, U.S. Department of Commerce, Special Publication 800-145, Sep. 2011, 7 pages.

* cited by examiner

*Primary Examiner* — Kuen S Lu
(74) *Attorney, Agent, or Firm* — Joseph P. Curcuru (57) ABSTRACT

In an approach to improve integration workflows by automatically generating convergent data mappings for branches in an integration workflow using a computer. A branch schema for each branch is generated, wherein the branch schema represents the union of all the individual node output schemas on the branch. A common output schema for a convergence point is generated, wherein the common output schema represents an intersection of all the branch schemas and generates branch mappings from each branch node to the common output schema.

20 Claims, 8 Drawing Sheets

AUTOMATIC GENERATION OF CONVERGENT DATA MAPPINGS FOR BRANCHES IN AN INTEGRATION WORKFLOW

BACKGROUND

The present invention relates to integration workflows, and more particularly to handling branches in workflows.

Integration tools are used to connect multiple Software as a Service (SaaS) systems in an integration workflow. Within these workflows, the term 'node' is used to describe a step in the workflow. Often, these nodes refer to interaction points with the external SaaS systems. Integration tools also often contain logic enabling the integration flow to diverge along different branched paths depending on predetermined conditions.

It is known to implement a schema when the different branch paths converge, providing a mechanism for downstream nodes to reference the output of a node on a branch. The implemented schema requires manually defining an output schema at convergence points and then manually defining the mappings to this output schema on each branch.

For more complex data flows, where the number of branches and the number of nodes on each branch can dramatically increase, this schema implementation becomes more and more time-consuming and unwieldy for a user.

SUMMARY

According to an aspect of the present invention there is a computer-implemented method for automatic generation of convergent data mappings for branches in an integration workflow, comprising: generating a branch schema for each branch, wherein the branch schema represents the union of all the individual node output schemas on the branch; generating a common output schema for a convergence point, wherein the common output schema represents an intersection of all the branch schemas; and generating branch mappings from each branch node to the common output schema.

According to another aspect of the present invention there is a system for automatic generation of convergent data mappings for branches in an integration workflow, comprising: a processor and a memory configured to provide computer program instructions to the processor to execute the function of the components: a branch schema component for generating a branch schema for each branch, wherein the branch schema represents the union of all the individual node output schemas on the branch; a common output schema component for generating a common output schema for a convergence point, wherein the common output schema represents an intersection of all the branch schemas; and a branch mapping component for generating branch mappings from each branch node to the common output schema.

According to a further aspect of the present invention there is a computer program product for automatic generation of convergent data mappings for branches in an integration workflow, the computer program product comprising a computer readable storage medium having program instructions embodied therewith, the program instructions executable by a processor to cause the processor to: generate a branch schema for each branch, wherein the branch schema represents the union of all the individual node output schemas on the branch; generate a common output schema for a convergence point, wherein the common output schema represents an intersection of all the branch schemas; and generate branch mappings from each branch node to the common output schema.

The computer readable storage medium may be a non-transitory computer readable storage medium and the computer readable program code may be executable by a processing circuit.

BRIEF DESCRIPTION OF THE DRAWINGS

The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of the present invention enable automatic generation of convergent data mappings for branches in an integration workflow by generating a common output schema for all branches and suggesting high-confidence mappings for each branch. A common output schema is generated for a convergence point and mappings are generated from output fields in each branch to the common output schema.

Figure 1:
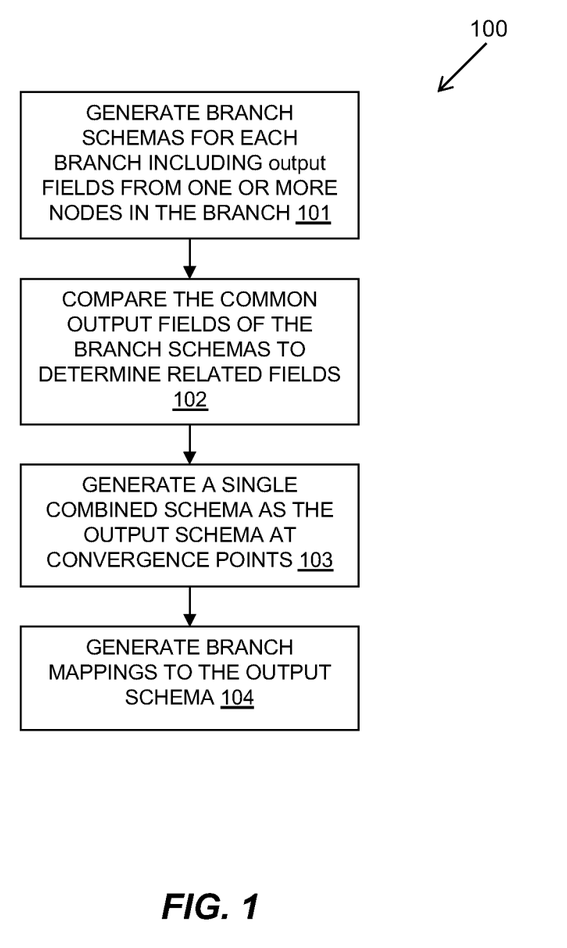
FIG. 1 is a flow diagram of an example embodiment of a method in accordance with the present invention.

Referring to FIG. 1, a flow diagram 100 shows an example method of automatic generation of convergent data mappings for branches in an integration workflow.

Embodiments of the present invention may generate 101 a branch schema for each branch, where the branch schema comprises output fields from one or more nodes in the branch. The branch schema represents the union of all the individual node output schemas on the branch, wherein the branch schema comprises one or more of the output fields of the individual node output schemas on the branch.

Branch schema generation may comprise generalizing output field properties in the branch schema for output fields in more than one node including modifying the field type definition to comprise equivalent fields across different nodes.

Embodiments of the present invention may compare 102 the common output fields of the branch schemas to determine related fields. Comparing the common output fields of the branch schemas may comprise applying a measure of similarity of the fields (such as a confidence measure) and discarding fields below a threshold similarity. A confidence map may be generated between fields in different schemas.

Embodiments of the present invention may then generate 103 a single common output schema formed of the related output fields. The common output schema represents an intersection of all the branch schemas to define an output schema at a convergence point. An intersection of all the branch schemas means an equivalent field must be in each of the branch schemas to be comprised in the common output schema.

Embodiments of the present invention may generate 104 mappings for each branch to the common output schema. Each branch will use the same common output schema, but each branch may individually have different mappings applied based on the upstream nodes in its respective branch. Those mappings are applied at the end of the branch at the convergence point.

Embodiments of the present invention automatically selects and creates unified field attributes, which provides an advantage in terms of time and a decrease of cognitive load on the user. Embodiments of the present invention generates a common output schema where the input is multiple branch schemas. By only creating one common output schema, a performance benefit is expected as opposed to running sequentially through chains of mappings.

The mapping carried out in embodiments of the present invention may be carried out by an existing mapping component of integration flow systems. Mapping components are known to use a pre-trained Artificial Intelligence (AI) algorithm which uses Natural Language Processing schema matching to find the closest match between source and target mappings. The algorithm assigns a percentage of confidence to each mapping suggestion based on semantic proximity to a target field, using business object metadata such as the field name, description, and display name to find the correct match. This means that the mapping component also facilitates mapping fields from custom objects and schemas where there are no field naming standards.

Such a known mapping component may be applied to provide a confidence map when comparing common fields of the branch schemas. A confidence map may provide a percentage of how well the common fields match. The mapping component may also be used to generate the branch mappings to the output schema.

For generating a confidence map, two or more schemas may be selected to be compared and matched. Each schema contains all available information and metadata about the node from where it was sourced and its fields. The following properties for each field detailed in the schema may be used as inputs to compare and gain confidence values:

field name;
field display name;
field description;
field type;
source (node) name;
source (node) operation (action e.g. Create) name;
source (node) object (e.g. ObjectA in System1) name.

Algorithms may be used for each comparison step such as natural language processing. An overall confidence value may be derived for each field comparison and if it meets a minimum value threshold it is added to a list of suggestions. The list of suggestions may then be sorted into a descending order, with the highest value typically being the one selected, or suggested first for the user.

The described method provides a key user experience differentiator in integration products by increasing speed and efficiency on user tasks over existing solutions. This reduces the cognitive load on the user as they do not have to work with many different output schemas.

Figure 2A:
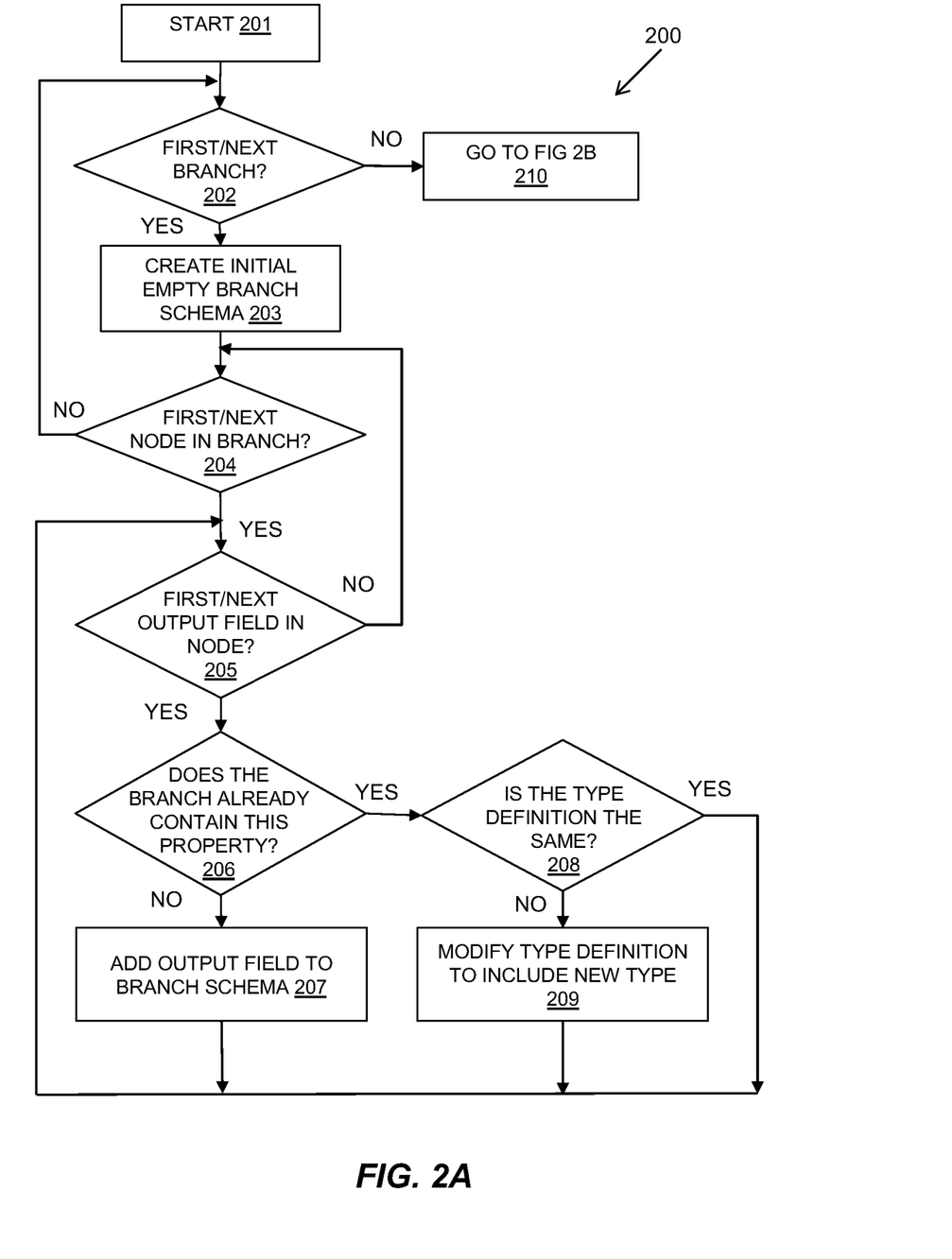
FIGS. 2A and 2B are flow diagrams of example embodiments of aspects of a method in accordance with the present invention.
Figure 2B:
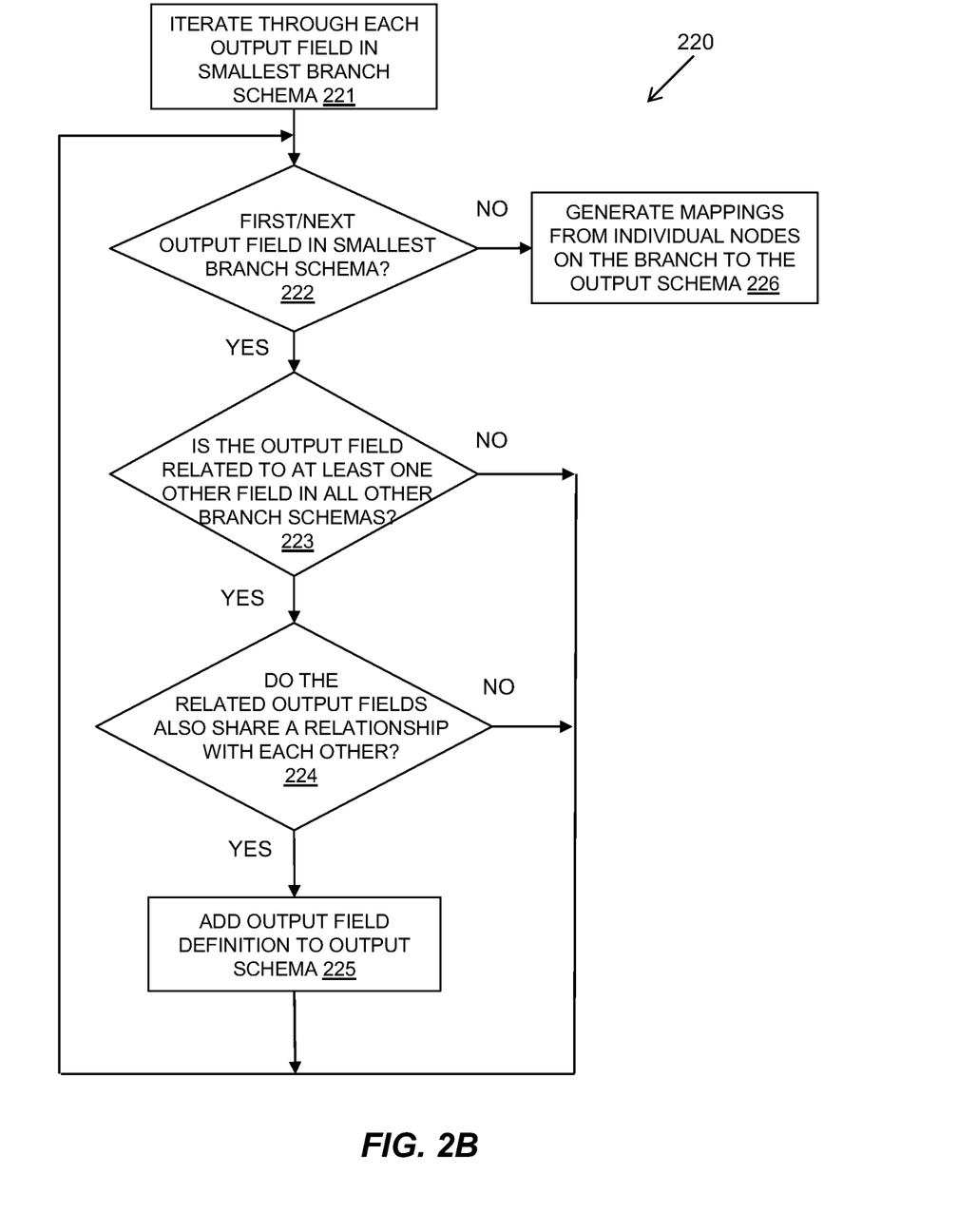

Referring to FIGS. 2A and 2B, flow diagrams 200, 220 show an example embodiment of the described method.

Embodiments of the present invention may iterate through all branches. For each branch, embodiments of the present invention iterates through the nodes in the branch, and for each node, embodiments of the present invention iterates through the output fields in each node, where a field property is a part of the output schema of each node. Once there are no output fields in a node, embodiments of the present invention iterates to a next node. Once there are no more nodes in a branch, embodiments of the present invention iterates to a next branch.

Embodiments of the present invention may start 201 and a first branch 202 is considered and an initial empty branch schema is created 203. Embodiments of the present invention considers 204 a first node in the branch and considers 205 a first output field in the node. For this output field, embodiments of the present invention determines 206 if the branch already contains this property. If it does not already contain this property, the output field is added 207 to the branch schema. If it already contains this property, embodiments of the present invention determines 208 if the type definition is the same. If it is not the same, the type definition is modified 209 to comprise the new type. Embodiments of the present invention then loops to consider 205 if there is a next output field in the node and embodiments of the present invention iterates for each additional output field.

Once consider 205 determines that there are no more output fields in the node, embodiments of the present invention loops to consider 204 if there is a next node in the branch. If there is a next node in the branch, embodiments of the present invention iterates through all the output fields in that node.

Once consider 204 determines that there are no more nodes in the branch, embodiments of the present invention loops to 202 to consider if there is a next branch. If there is a next branch, embodiments of the present invention creates 203 an initial empty branch schema for the next branch and embodiments of the present invention iterates through all the nodes in this branch and through all the fields in each node.

Once it is determined that there are not more branches, embodiments of the present invention results in branch schemas for each branch and goes to the flow of FIG. 2B.

Referring to FIG. 2B, a flow diagram 220 shows an example of a method carried out once the branch schemas have been obtained, for example, by embodiments of the present invention of FIG. 2A.

The smallest branch schema is selected as the branch schema with the least number of output fields and embodiments of the present invention iterates 221 through each output field of the smallest branch schema.

A first output field in the smallest branch schema is considered 222 and it is determined 223 if the output field is related to at least one other output field in all the other branch schemas. If it is not so related, embodiments of the present invention loops to determine 222 if there is a next output field in the smallest branch schema.

If the output field is related to at least one other output field in all the other branch schemas, embodiments of the present invention may determine 224 if the related output fields also share a relationship with each other. This may comprise determining a confidence level of the relationship and applying a threshold confidence level below which it is determined that a relationship does not exist or is not sufficiently strong.

If it is determined 224 that a relationship does not exist or is not sufficiently strong, embodiments of the present invention may loop to determine 222 if there is a next output field in the smallest branch schema. If it is determined 224 that a relationship does exist, a field definition is added 225 to the output schema. Again, embodiments of the present invention loops to determine 222 if there is a next output field in the smallest branch schema.

Once there are no more output fields to consider in the smallest branch schema, the output schema is complete and embodiments of the present invention may generate 226 mappings from individual nodes of the branch to the output schema.

Figure 3:
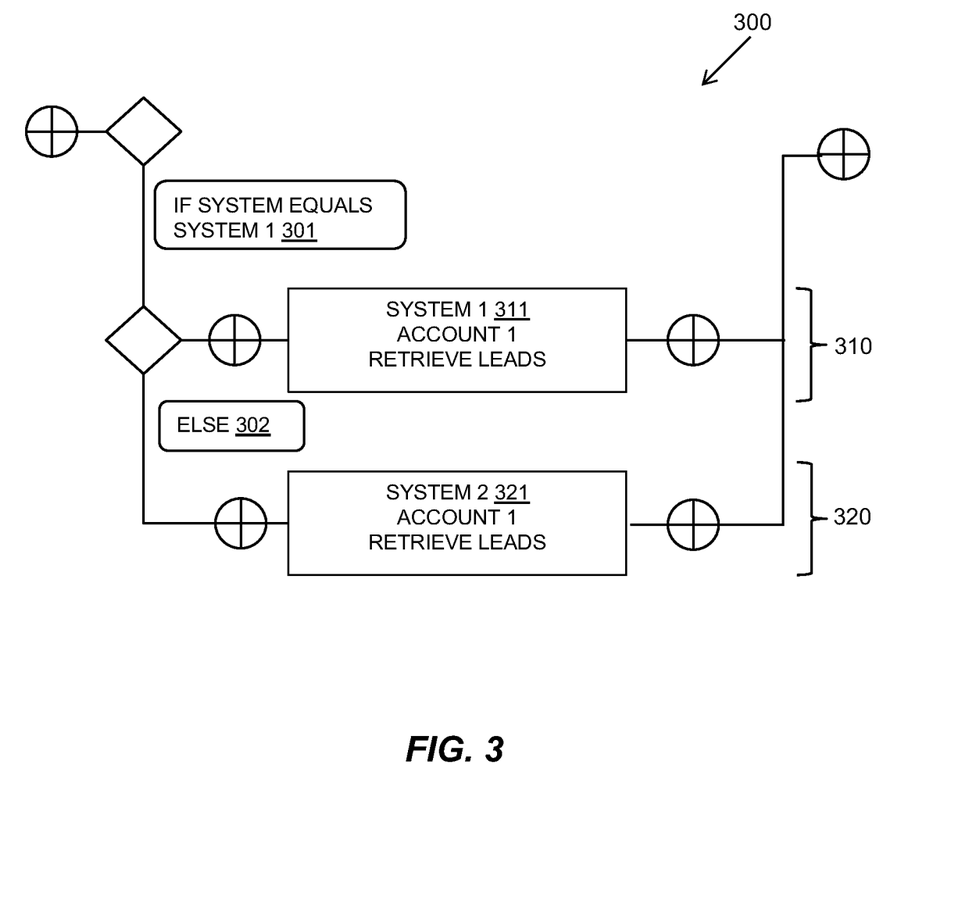
FIG. 3 is a schematic diagram of an example embodiment of a branched integration flow to which the present invention may be applied.

Referring to FIG. 3, a schematic diagram illustrates an example scenario of a branching integration flow 300. The example scenario is described with a simplified example of a user with multiple Customer Relationship Management (CRM) systems, referred to as System1 and System2, which may be, for example, a sales system and a marketing system. A user may want to retrieve data about a particular customer from one of their applications. In that case, a user's flow may contain some logic 301 to branch 310 (referred to as Branch A) to retrieve leads from System1 311 or logic 302 to branch 320 (referred to as Branch B) to retrieve leads from System2 321, with the branches converging again.

A simplified System1 lead may have a schema of the following form:

```
{
    "properties": {
        "LastName": {
            "title": "Last Name",
            "description": "Last Name",
            "type": "string"
        },
        "FirstName": {
            "title": "First Name",
            "description": "First Name"
            "type": "string"
        },
        "Company": {
            "title": "Company",
            "description": "Company",
            "type": "string"
        },
        "Email": {
            "title": "Email",
            "description": "Email",
            "type": "string"
        }
        ...other non-common System1-specific properties
    }
}
```

Similarly, a simplified System2 lead may have a schema of the following form:

```
{
    "properties": {
        "lastName": {
            "title": "Last name",
            "description": "Last name",
            "type": "string"
        },
        "firstName": {
            "title": "First name",
            "description": "First name",
            "type": "string"
        },
        "companyName": {
            "title": "Company name",
            "description": "Lead's company name"
            "type": "string"
        },
        "emailAddress": {
            "title": "Email address",
            "description": "Lead's email address",
            "type": "string"
        }
        ...other non-common System2-specific properties
    }
}
```

The properties that have been singled out are similar, but not exactly the same. First, embodiments of the present invention may generate branch schemas, referred to as schema A and schema B. As there is only one node on each branch, each branch schema is equivalent to the single node on its branch. So the schema for branch A is equivalent to the System1 schema, and the schema for branch B is equivalent to the System2 schema.

A mapping component is leveraged to assist in generating a schema which is an intersection of all the branch schemas, in this case the schema for branch A and the schema for branch B. For each output field in the schema for branch A, the mapping component is used to assess how related each output field in the schema for branch B is. A sample output might look like the following:

```
{
    LastName: {
        B: {
            lastName: 0.95,
            firstName: 0.5,
            companyName: 0.4,
            emailAddress: 0.2,
        ...etc.
        }
    }
}
```

Any field below a preconfigured threshold is discarded. For example, with a threshold of 0.8, leaving:

```
{
    LastName: {
        B: {
            lastName: 0.95
        }
    }
}
```

Fields can only be considered as intersections if they intersect with the same fields in all other branches.

For two branches, this is relatively trivial. Embodiments of the present invention may simply need to check that A.fieldA is related to B.fieldB. The inverse (B.fieldB is related to A.fieldA) is true by default.

For three branches, embodiments of the present invention may check if A.fieldA is related to B.fieldB, A.fieldA is related to C.fieldC, and B.fieldB is related to C.fieldC, and so on.

In the example, A.LastName and B.lastName is an intersection. This process is repeated for all fields in A and B, until all the intersecting fields have been calculated.

This leaves a final common output schema of:

```
{
    "properties": {
        "LastName": {
            "type": "string"
        },
        "FirstName": {
            "type": "string"
        },
        "Company": {
            "type": "string"
        },
        "Email": {
            "type": "string"
        }
    }
}
```

Finally, for each branch, the mapping component is used to automatically generate mappings to the output schema.

So for Branch A:
System1.LastName --maps to--<Output.LastName
System1.FirstName --maps to--<Output.FirstName
System1.Company --maps to--<Output.Company
System1.Email --maps to--<Output.Email
and for Branch B:
System2.lastName --maps to--<Output.LastName
System2.firstName --maps to--<Output.FirstName
System2.company --maps to--<Output.Company
System2.email --maps to--<Output.Email Although this is a simplified example using two branches and two schemas, it should be clear that this can be arbitrarily extended to any number of branches and nodes.

Figure 4:
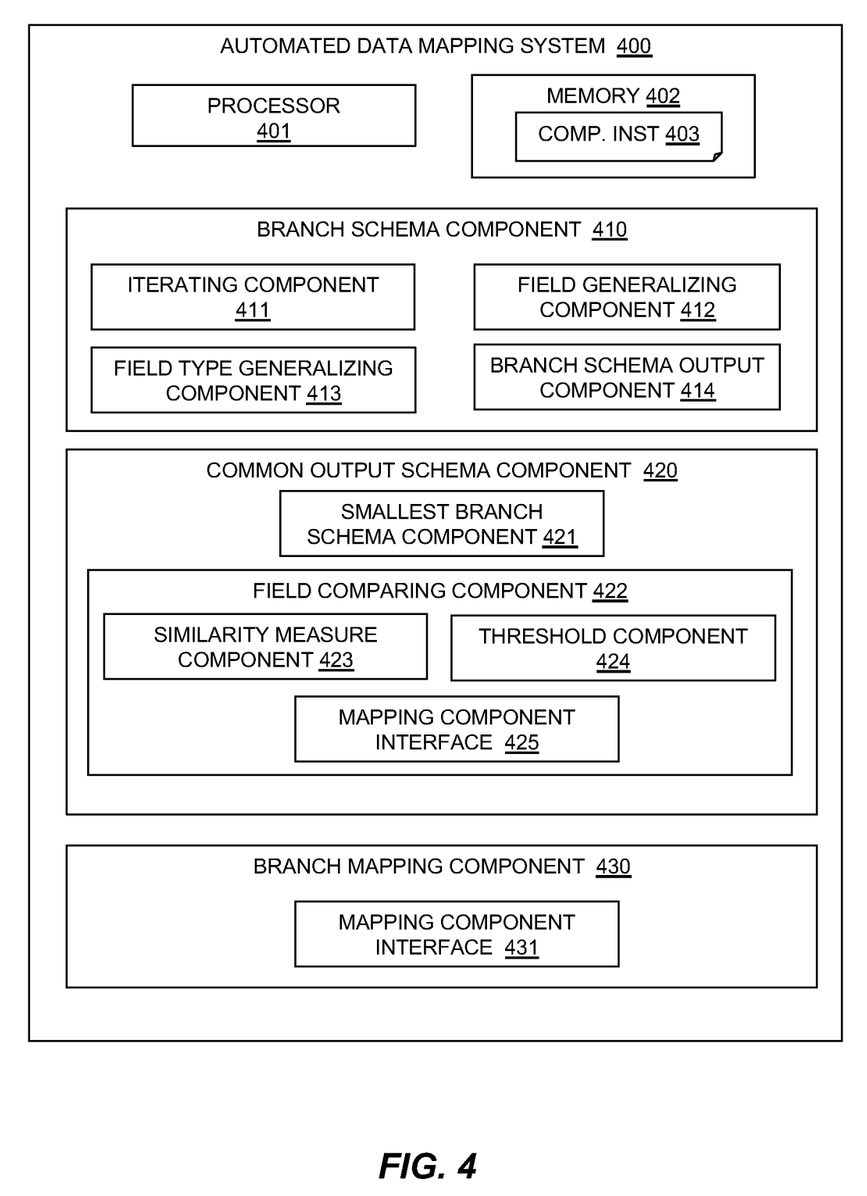
FIG. 4 is block diagram of an example embodiment of a system in accordance with the present invention.

Referring to FIG. 4, a block diagram shows an automated data mapping system 400 for automatic generation of convergent data mappings for branches in an integration workflow. The automated data mapping system 400 comprises at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The automated data mapping system 400 comprises a branch schema component 410 for generating a branch schema for each branch with the branch schema representing the union of all the individual node output schemas on the branch. The branch schema component 410 may comprise an iterating component 411 for, for each branch, iterating through each output field of each node on the branch to add all fields to the branch schema. The branch schema component 410 may comprise a field generalizing component 412 for generalizing equivalent field properties in the branch schema for fields in more than one node and a field type generalizing component 413 for modifying the field type definition to comprise equivalent fields across different nodes. The branch schema component 410 comprises a branch schema output component 414 for outputting the generated branch schemas.

The automated data mapping system 400 comprises a common output schema component 420 for generating a common output schema for a convergence point with the common output schema representing an intersection of all the branch schemas. The common output schema component 420 may comprise a smallest branch schema component 421 for iterating through fields of a smallest branch schema to identify common related fields.

The common output schema component 420 may comprise a field comparing component 422 for comparing common output fields of the branch schemas to determine related fields and including the related fields in the common output schema. The field comparing component 422 may comprise a similarity measure component 423 or applying a measure of similarity to the common fields and a threshold component 424 for determining related fields to have a measure of similarity greater than a configured threshold measure. The field comparing component 422 may comprise a mapping component interface 425 to enable use of a mapping component applying pretrained algorithms and mapping histories.

The automated data mapping system 400 comprises a branch mapping component 430 for generating branch mappings from each branch node to the common output schema. The branch mapping component 430 may generate a mapping from a field in each branch node to the field in the common output schema. The branch mapping component 430 may comprise a mapping component interface 431 to enable use of a mapping component applying pretrained algorithms and mapping histories.

Figure 5:
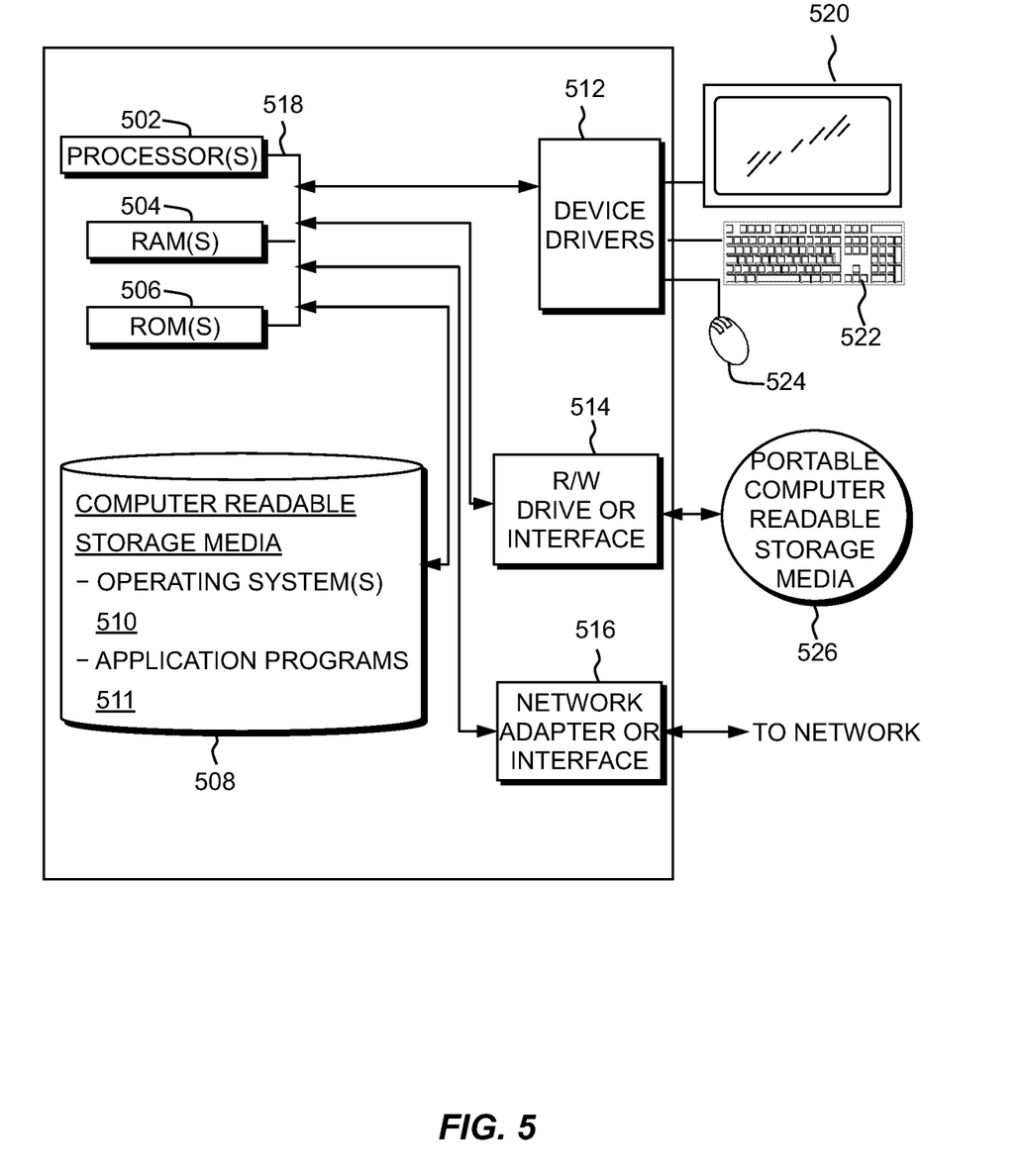
FIG. 5 is a block diagram of an embodiment of a computer system or cloud server in which the present invention may be implemented.

FIG. 5 depicts a block diagram of components of a computing system as used for the automated data mapping system 400, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

The computing system can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511 are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 514 to read from and write to one or more portable computer readable storage media 526. Application programs 511 on the computing system can be stored on one or more of the portable computer readable storage media 526, read via the respective R/W drive or interface 514 and loaded into the respective computer readable storage media 508.

The computing system can also include a network adapter or interface 516, such as a TCP/IP adapter card or wireless communication adapter. Application programs 511 on the computing system can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

The computing system can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
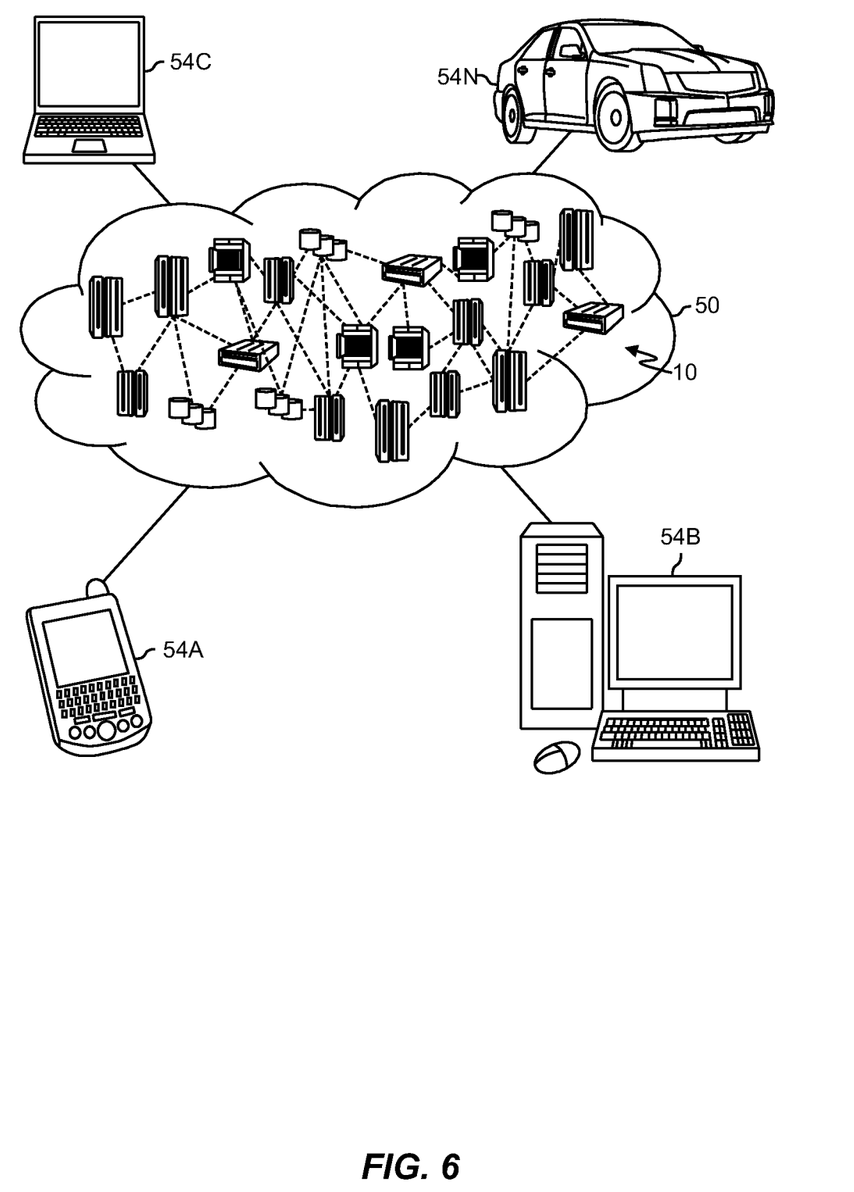
FIG. 6 is a schematic diagram of a cloud computing environment in which the present invention may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
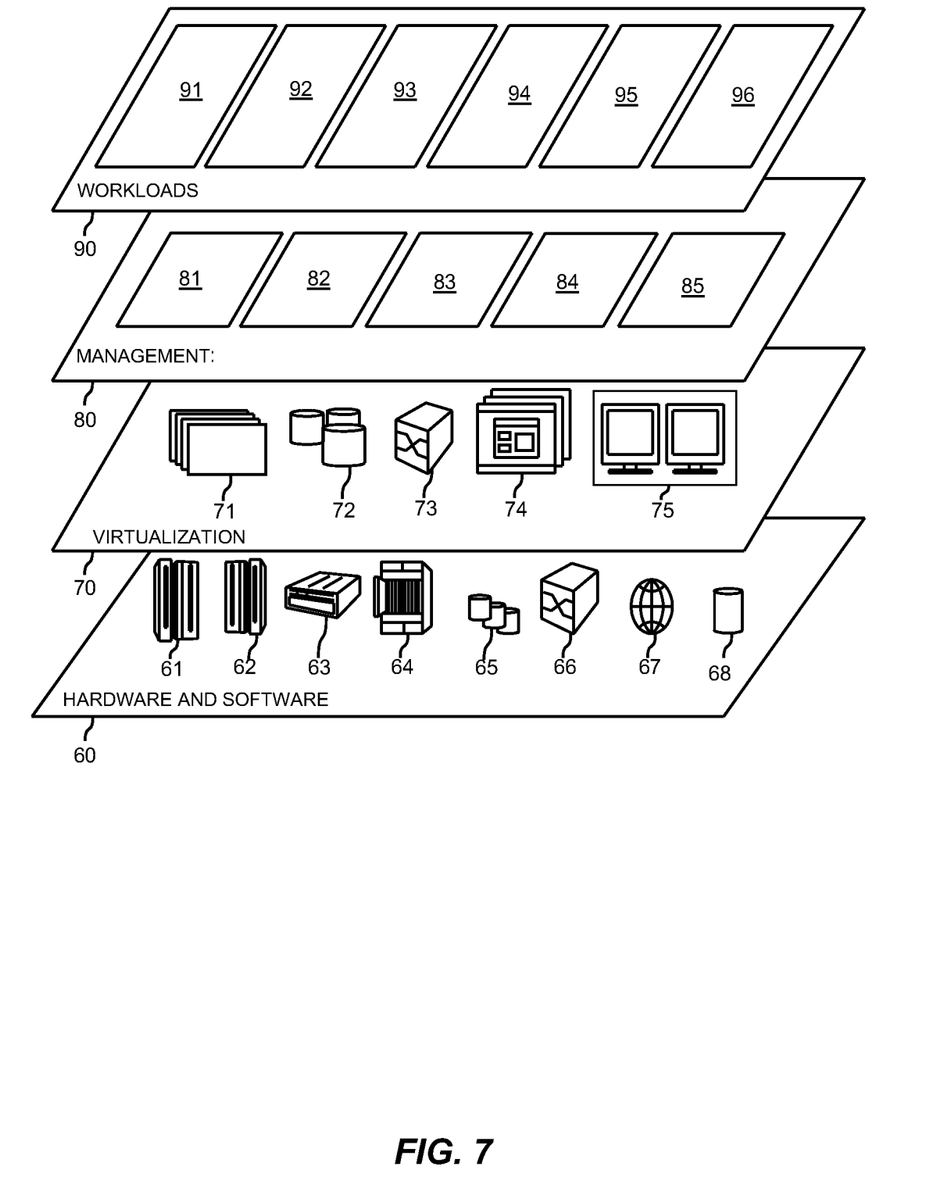
FIG. 7 is a diagram of abstraction model layers of the cloud computing environment in which the present invention may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workflow integration processing 96.

A computer program product of the present invention comprises one or more computer readable hardware storage devices having computer readable program code stored therein, said program code executable by one or more processors to implement Embodiments of the present invention s of the present invention.

A computer system of the present invention comprises one or more processors, one or more memories, and one or more computer readable hardware storage devices, said one or more hardware storage device containing program code executable by the one or more processors via the one or more memories to implement Embodiments of the present invention s of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for automatic generation of convergent data mappings for branches in an integration workflow, comprising:
   generating a branch schema for each branch, wherein the branch schema represents a union of the individual node output schemas on a branch;
   selecting and creating one or more unified field attributes, wherein the one or more unified filed attributes provide an advantage in terms of time and a decrease in cognitive load;
   generating a common output schema for a convergence point, wherein the common output schema represents an intersection of the branch schemas; and
   generating branch mappings from each branch node to the common output schema.

2. The method as claimed in claim 1, wherein generating the common output schema for the convergence point comprises comparing common output fields of the branch schemas to determine related fields and including the related fields in the common output schema.

3. The method as claimed in claim 2, wherein comparing common output fields comprises applying a measure of similarity to the common output fields and determining the related fields have a measure of similarity greater than a configured threshold measure.

4. The method as claimed in claim 3, wherein comparing the common output fields is carried out by a mapping component applying pretrained algorithms and mapping histories.

5. The method as claimed in claim 1, wherein generating the branch schema for each branch comprises, for each branch, iterating through each output field of each node on the branch to add the output fields to the branch schema with generalized type definitions for common output fields.

6. The method as claimed in claim 1, wherein generating a branch schema for each branch comprises generalizing equivalent field properties in the branch schema for output fields in more than one node including modifying a field type definition to comprise equivalent fields across different nodes.

7. The method as claimed in claim 1, wherein generating the common output schema comprises iterating through output fields of a smallest branch schema to identify common related output fields.

8. The method as claimed in claim 1, wherein generating branch mappings from each branch to the common output schema generates a mapping from an output field in each branch node to the output field in the common output schema.

9. The method as claimed in claim 1, wherein generating branch mappings from each branch node to the common output schema is carried out by a mapping component applying pretrained algorithms and mapping histories.

10. A system for automatic generation of convergent data mappings for branches in an integration workflow, comprising:
   a processor and a memory configured to provide computer program instructions to the processor to execute the function of components:
   a branch schema component for generating a branch schema for a branch, wherein the branch schema represents a union of an individual node output schemas on the branch;
   a branch schema component for selecting and creating one or more unified field attributes, wherein the one or more unified filed attributes provide an advantage in terms of time and a decrease in cognitive load;
   a common output schema component for generating a common output schema for a convergence point, wherein the common output schema represents an intersection of the branch schemas; and
   a branch mapping component for generating branch mappings from each branch node to the common output schema.

11. The system as claimed in claim 10, wherein the common output schema component comprises a field comparing component for comparing common output fields of the branch schemas to determine related fields and comprising the related fields in the common output schema.

12. The system as claimed in claim 11, wherein the field comparing component comprises a similarity measure component for applying a measure of similarity to the common output fields and a threshold component for determining the related fields to have a measure of similarity greater than a configured threshold measure.

13. The system as claimed in claim 12, wherein the field comparing component uses a mapping component applying pretrained algorithms and mapping histories.

14. The system as claimed in claim 10, wherein the branch schema component comprises an iterating component, for each branch, iterating through each output field of each node on the branch to add the output fields to the branch schema with generalized type definitions for common output fields.

15. The system as claimed in claim 10, wherein the branch schema component comprises a field generalizing component for generalizing equivalent field properties in the branch schema for output fields in more than one node.

16. The system as claimed in claim 15, wherein the branch schema component comprises a field type generalizing component for modifying a field type definition to comprise equivalent fields across different nodes.

17. The system as claimed in claim 10, wherein the common output schema component comprises a smallest branch schema component for iterating through output fields of a smallest branch schema to identify common related output fields.

18. The system as claimed in claim 10, wherein the branch mapping component generates a mapping from an output field in each branch node to the output field in the common output schema.

19. The system as claimed in claim 10, wherein the branch mapping component uses a mapping component applying pretrained algorithms and mapping histories.

20. A computer program product for automatic generation of convergent data mappings for branches in an integration workflow, the computer program product comprising a computer readable storage medium having program instructions embodied therewith, the program instructions executable by a processor to cause the processor to:
   generate a branch schema for each branch, wherein the branch schema represents a union of individual node output schemas on a branch;
   select and create one or more unified field attributes, wherein the one or more unified filed attributes provide an advantage in terms of time and a decrease in cognitive load;
   generate a common output schema for a convergence point, wherein the common output schema represents an intersection of all the branch schemas; and
   generate branch mappings from each branch node to the common output schema.

* * * * *